D. B. LUTEN.
REINFORCED STRUCTURE.
APPLICATION FILED DEC. 11, 1908.

1,070,707.

Patented Aug. 19, 1913.
3 SHEETS—SHEET 1.

Witnesses
Frank A. Falk
Thomas W. McMeans

Inventor
Daniel B. Luten,
By Bradford Hood
Attorneys

D. B. LUTEN.
REINFORCED STRUCTURE.
APPLICATION FILED DEC. 11, 1908.
1,070,707.
Patented Aug. 19, 1913.
3 SHEETS—SHEET 2.
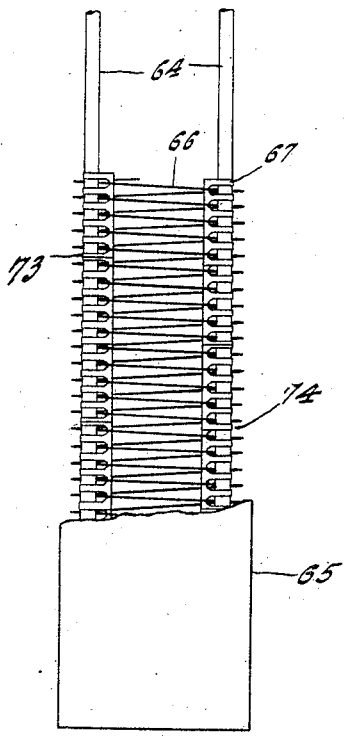
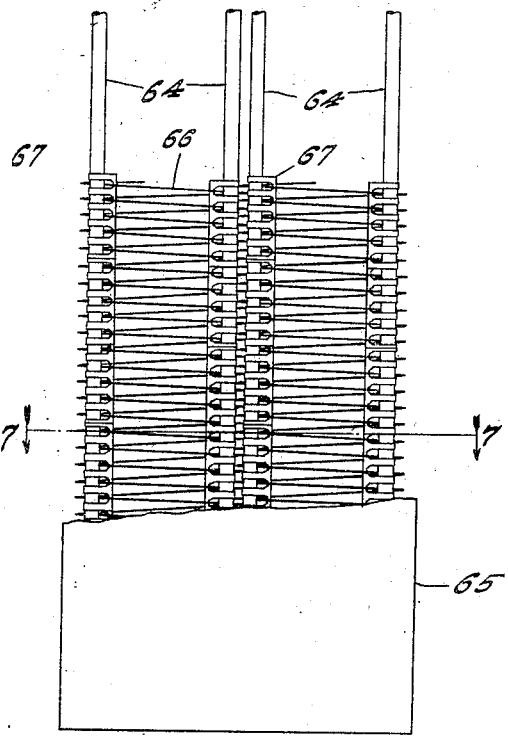
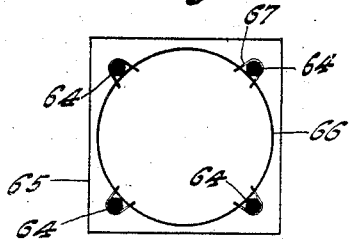
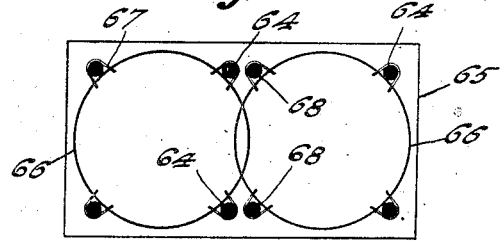
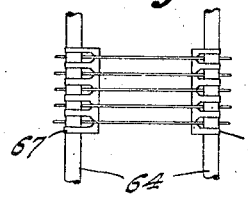
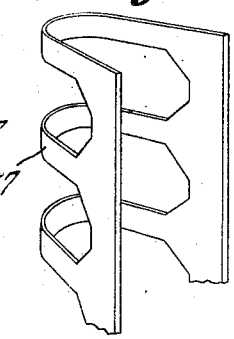
Witnesses
Frank A. Fahl
Thomas W. McMeans
Inventor
Daniel B. Luten,
By Bradford Hood
Attorneys

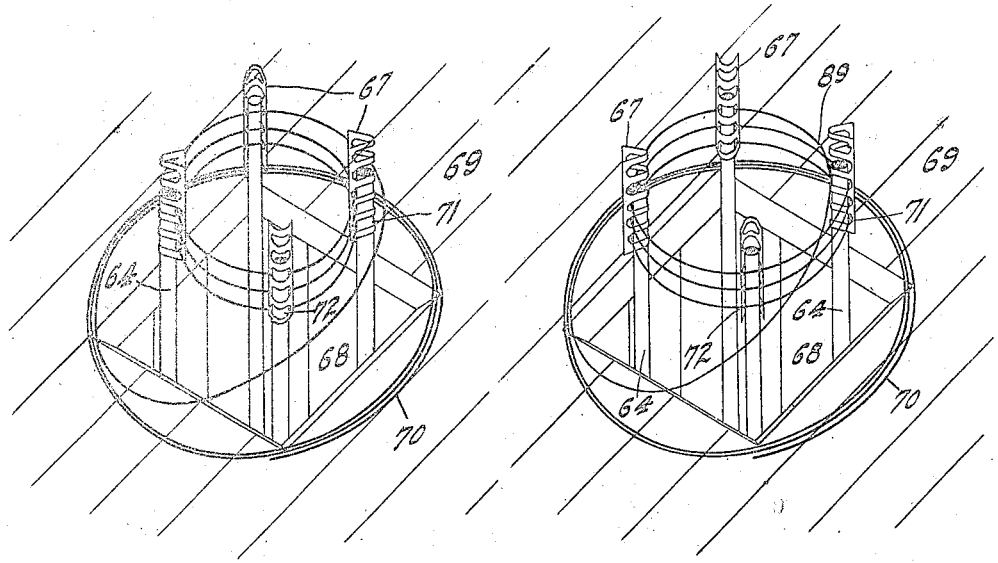
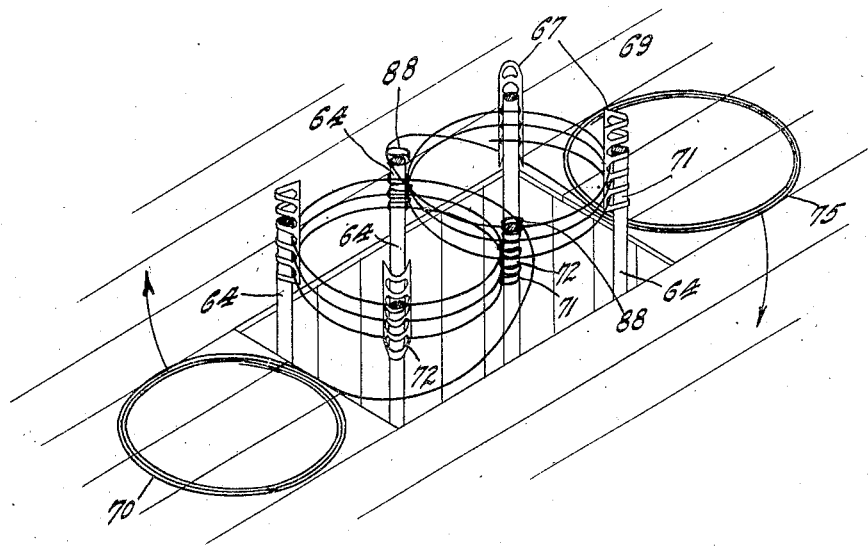

UNITED STATES PATENT OFFICE.

DANIEL B. LUTEN, OF INDIANAPOLIS, INDIANA.

REINFORCED STRUCTURE.

1,070,707.      Specification of Letters Patent.      Patented Aug. 19, 1913.

Application filed December 11, 1908. Serial No. 467,095.

*To all whom it may concern:*

Be it known that I, DANIEL B. LUTEN, a citizen of the United States, residing at Indianapolis, in the county of Marion and State of Indiana, have invented certain new and useful Improvements in Reinforced Structures and the Art of Producing the Same, of which the following is a specification.

My invention relates to improvements in the construction of walls and columns employed in building structures of various sorts, and the invention has for its general object to provide an improved structural member of the class above mentioned, characterized by greater strength and durability together with greater economy in cost and materials as compared with similar structures at present in use.

To these and other ends my invention consists in general in a wall or column structure principally characterized by the incorporation therein of tension or reinforcing members so disposed as to bond the structure against breakage in all directions in which it may be subjected to strain.

The fundamental features of this invention were shown in an application filed by me on the 23d day of July, 1904, Serial No. 217,767, which is a division of an application filed by me on the 17th day of May, 1902, Serial No. 107,812.

Figure 1:
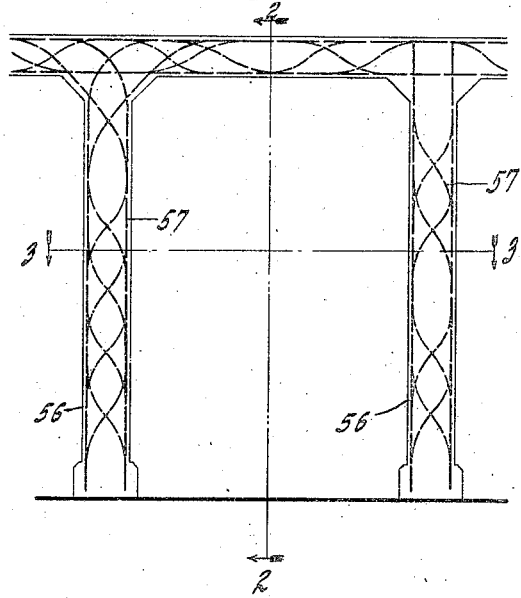
Figure 2:
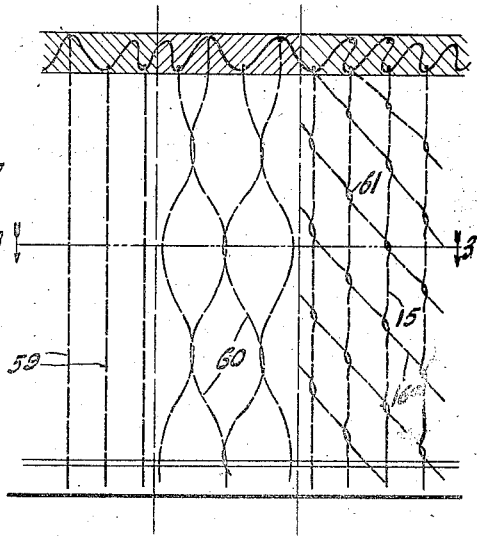
Figure 3:
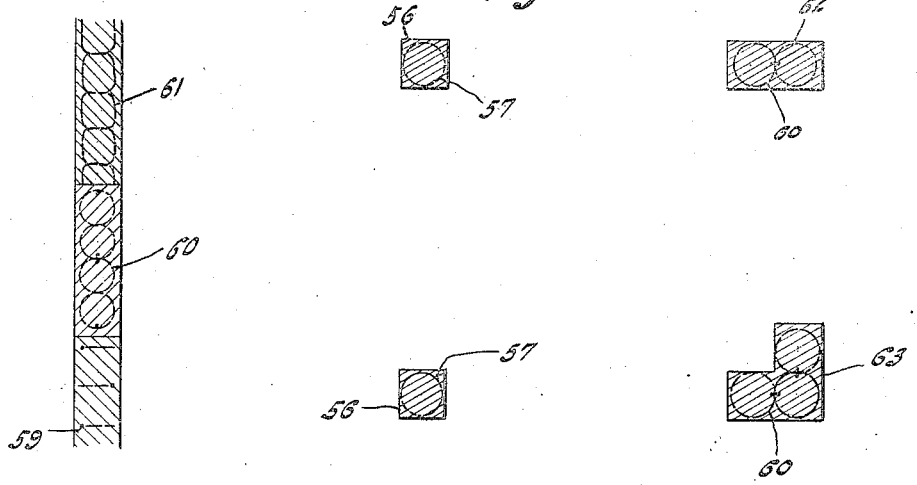

In the accompanying drawings I have illustrated a combination of structural members thus equipped with tension members disposed in a variety of relations to secure effective resistance to disruptive strains occurring longitudinally, cross-wise, and width-wise of the member; and referring thereto, Figure 1 shows a structure composed of beams supported on a wall or column; Fig. 2 is a vertical section of a similar structure on the line 2—2 of Fig. 1; Fig. 3 is a horizontal sectional view on the line 3—3 of Figs. 1 and 2; Fig. 4 is a horizontal section of a column showing in detail the method of reinforcing; Fig. 5 is an elevation of the reinforcing in a column; Fig. 6 is an elevation of the reinforcing for a column of greater width than thickness; Fig. 7 is a horizontal section of Fig. 6 on the line 7—7; Fig. 8 is an elevation showing a modified arrangement of the hooping reinforcement; Figs. 9 and 10 are perspective details of desirable forms of clamps; Figs. 11 and 12 are perspective views showing the method of forming the reinforcement for a column; Fig. 13 is a perspective illustrating the method of forming the multiple reinforcement for a column of greater width than thickness.

In Fig. 1 the wall or column 56 is provided with rods or tension members following one face closely for a short distance, then passing across to follow the other face similarly, the purpose being to resist the tensile stresses caused in such columns by transverse forces either applied directly or through connected members, and also to bond the material of the column together in a cross-wise direction as well as in its longitudinal dimension to prevent it from bursting under transverse stresses set up therein, as by a strong force applied longitudinally thereof.

Fig. 2 represents a vertical section through a structure such as is shown in Fig. 1 and in a plane at right angles to the plane of Fig. 1, this view showing at the left the reinforcing members 59 as above described extending in vertical parallel planes and bonding the material of the column in two dimensions only, as above described. But by arranging the rods or members in a helix or spiral as at 60 wherein they not only pass back and forth from face to face of the column but also extend widthwise of the latter, the material is also bonded in the transverse dimensions making it secure against cracking or bursting in all three dimensions. The arrangement illustrated at the right of the figure accomplishes the same end, being a series of interlooped rods each bent to present alternate vertical and diagonal or oblique portions 15 and 16ª respectively thus forming a square or rectangular helix, adjacent rods of the helices interlooping with each other at the bends.

Fig. 3 is a horizontal section showing the arrangement in plan of reinforcement in wall and column. Thus at 59 the reinforcement in the wall is shown as described in the first arrangement. At 60 the reinforcement is shown arranged in interlooping spirals. At 61 the rectangular helices are shown in plan. And at 57 the spiral reinforcement is shown in plan in the columns and arranged in a circle approximately in the tension regions of and tangent to, the four sides of the square column. At 62 a rectangular column is shown, that is, one having greater width than thickness, and at 63 an L column adapted to a corner support. In each of these columns the interlocking spirals 60 are shown. By these means a column or wall is not only prevented from buckling under a longitudinal force, but it is also restrained from bursting or shearing, and is thus enabled to support far greater intensity of stress than would be the case in a column not thus reinforced. For greater efficiency against bursting stresses in the column when subjected to longitudinal compression, a hooping reinforcement of coils or spirals of substantially circular plan is desirable. In a wall however, or in any column of greater width than thickness, it is not possible to inscribe a circle to include a maximum of the compression area. But by arranging spirals or hoops in series, a maximum area of compression can be inclosed and, if the arrangement be such that adjacent sets of longitudinal hooping or helices interloop, or interlock, or interdigitate, great efficiency can be effected.

In Fig. 4 the column is shown in plan with longitudinal reinforcing rods 64 arranged substantially parallel to the sides of the column 65. In conjunction with these rods is wound the hooping reinforcement 66 which is attached to the longitudinals at each crossing by passing through an opening in a metal clamp 67 of U shape designed to fit upon the longitudinal rod and held in place by it in the clamp. This clamp is of a form similar to that described in my application Serial No. 377,692, filed June 7, 1907, and also in my application Serial No. 336,157, filed September 25, 1906, but using the longitudinal reinforcement to lock the transverse members, instead of a wedge. The hooping reinforcement may be of round rods or flat straps or any other convenient section, and the perforations in the clamp arranged accordingly. Obviously it is possible to accomplish a similar result by using separate hoops for the hooping reinforcement instead of continuous spirals. In square or rectangular columns, the longitudinals are preferably located outside the hooping, in order that they may be farther from the axis, thus increasing their radius of gyration about the axis of the column and preventing buckling of the column.

Fig. 5 shows the hooped reinforcement clamped to the longitudinal reinforcement, the clamps being arranged in short sections to facilitate manufacture of clamps and weaving of reinforcement as will be explained in detail in connection with Figs. 11, 12 and 13.

Figs. 6 and 7 are views similar to Figs. 5 and 4 respectively, of a column having greater width than thickness and reinforced with two sets of hooped longitudinals. The hoops of one set may be interdigitated with the other set, or, by a process of weaving explained later, one spiral may be made to pass through the corresponding loop of the other spiral thus interlocking the two sets at as frequent intervals as may be desired. By a modification of the clamp, as shown at 88 in Fig. 13, and in greater detail in Fig. 10, the two intermediate longitudinals may be replaced by one member in common for the two pairs.

In Fig. 8 is shown the hooped reinforcement consisting of separate hoops instead of spirals. The clamp shown in Figs. 4, 5, 6 and 7, is shown in detail in Fig. 9, and the wire clamp of Fig. 13 is shown in detail in Fig. 10. My invention further includes a process of weaving such reinforcements, as explained in Figs. 11, 12, and 13. It has heretofore been customary to manufacture column reinforcement and then raise it to place, after which the forms were erected around the reinforcement preparatory to placing the concrete. It has usually been necessary to wind the hooping upon a wooden forming cylinder to which the longitudinal members were first attached, then the transverse hoops connected to the longitudinals, after which the completed reinforcement was removed from the forming cylinder and placed in position in the proposed column. This common process is not only tedious and expensive, but it necessitates the placing of the steel for columns before the erection of forms. Such procedure of necessity delays the construction of a building because the steel workers are continually in the way of the carpenters. My present method obviates this difficulty in the following manner: As shown in Fig. 11 I first erect the forms for the column, then place the longitudinal reinforcement, after which I weave the hooped reinforcement on the longitudinals from the top. Thus the forms 68 are shown for the column and forms or centering 69 for the floor, with the longitudinals 64 projecting from the forms. A coil of hooping 70 is so arranged as to be readily placed about the longitudinals. The end of the coil is passed through one of the perforations 71 in a clamp, which is then passed over the end of one of the longitudinal rods. The hooping is then passed into the perforation 72 of another clamp over the adjacent longitudinal rod, continuing thus around the column, and returning to the first clamp the spiral enters the second perforation in that clamp, and so on for all the others, the pitch of the spiral being thus determined by the spacing of the perforations in the clamps. It would of course be difficult to perform this operation with clamps of the entire lengths of the rods, and the clamps are therefore made up of short lengths say one to two feet each, and as the spiral is worked into a short length of clamp, it is forced downward on the longitudinal and new lengths of clamps are added, abutting at their ends as at 73, or overlapping as at 74, in Fig. 5. In this way the hooping reinforcement is woven at the top and slides down the longitudinals until the entire column reinforcement of longitudinal rods is bound about with a clamped hooping from bottom to top. For a column having corners it is desirable that the longitudinals occupy the corners, and in such cases the hooping would preferably be arranged inside the longitudinals. This is readily accomplished as shown in Fig. 11, by arranging the clamps 67 outside the rods and the hooping inside. In some cases however it may be desirable to have the longitudinals inclosed by the hooping and the modified method for accomplishing this is shown in Fig. 12. Thus it is necessary only to reverse the clamps and to pass the coil over the top of the clamp and then downward, as at 89, to its proper perforation in the clamp.

In Fig. 13 the method is illustrated in connection with a double reinforcement for a widened column and in this case one set of longitudinal members serves in common for both reinforcements. A modified clamp 88 is used consisting of a closed ring of wire bent to inclose the transverse reinforcement and the longitudinal in the same manner as a single perforation of the sheet metal clamp. This form of clamp is shown in detail in Fig. 10. The hoops of one set of reinforcement alternate with the hoops of the other set on these common longitudinals. Sheet metal clamps 67 on the other longitudinals maintain the form and pitch of the reinforcement. In this system of double reinforcement the coils may be placed as shown in Fig. 13, and as each strand is carried to the longitudinals, it may be inverted, thus taking its proper place and alternating with hoops from the other coil, producing an interdigitating of loops that may be extended to any number of such reinforcements in a series in a column or wall. This method of arranging the coil and inverting each strand may of course be employed in the single reinforcements shown in Figs. 11 and 12, instead of the arrangement there shown.

If in the double reinforcement, it be desired to pass one loop through the other corresponding loop, it may be readily accomplished by carrying the coils 70 and 75 around the column, (see the arrows in Fig. 13), as the strands are unwound from the coils and hooped about the longitudinals. It is of course essential in performing this process of weaving the reinforcement, that the longitudinals be held in substantial parallelism, and that the clamps all have sufficient play to slide, preferably freely, upon them. By this method of forming the reinforcement, I am enabled to erect the forms for all columns and floors before placing the steel. Then, while the steel for the floor reinforcement is being placed, the steel for the columns may also be placed, and the hooping woven on the longitudinals without delaying either the erection of forms or the placing of steel; thus facilitating organization and speed in erection. It is moreover much more economical of time and expense than the old method of first forming the reinforcement and then placing it.

I claim:—

1. A wall of hardened plastic reinforced with embedded tension members arranged in helical spirals in series having their axes substantially parallel to each other and to the surfaces of the wall, the member forming one spiral passing between the member and the axis of the adjacent spiral.

2. A wall having reinforcing members embedded therein in adjacent spirals, coils of one spiral passing through corresponding coils of the adjacent spiral.

In witness whereof, I, have hereunto set my hand and seal at Indianapolis, Indiana, this ninth day of December, A. D. one thousand nine hundred and eight.

DANIEL B. LUTEN. [L. S.]

Witnesses:
C. H. KNIGHT,
MAUDE M. EDKINS.